(12) United States Patent
Lin

(10) Patent No.: US 9,563,802 B2
(45) Date of Patent: Feb. 7, 2017

(54) FINGERPRINT IDENTIFICATION CHIP WITH ENHANCED ESD PROTECTION

(71) Applicant: EGALAX_EMPIA TECHNOLOGY INC., Taipei (TW)

(72) Inventor: Po-Chuan Lin, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 10 days.

(21) Appl. No.: 14/678,645

(22) Filed: Apr. 3, 2015

(65) Prior Publication Data
US 2016/0154989 A1 Jun. 2, 2016

(30) Foreign Application Priority Data

Nov. 28, 2014 (TW) .............................. 103141358 A

(51) Int. Cl.
G06K 9/00 (2006.01)
(52) U.S. Cl.
CPC ................................. G06K 9/00053 (2013.01)
(58) Field of Classification Search
CPC .................... G06K 9/00053; G06K 9/00013
USPC ........................................................ 382/124
See application file for complete search history.

(56) References Cited

U.S. PATENT DOCUMENTS

| | | | | |
|---|---|---|---|---|
| 6,069,970 A * | 5/2000 | Salatino | ............... | G06K 9/0012 235/380 |
| 6,628,812 B1 * | 9/2003 | Setlak | ................... | G06F 1/1616 382/124 |
| 7,397,096 B2 * | 7/2008 | Chou | ................. | G06K 9/00026 257/414 |
| 7,629,200 B2 * | 12/2009 | Miyai | ............... | G06K 9/00053 257/E21.054 |
| 9,129,143 B2 * | 9/2015 | Shie | ...................... | G06K 9/0002 |
| 9,147,100 B1 * | 9/2015 | Lin | .................... | G06K 9/00053 |

* cited by examiner

Primary Examiner — Daniel Mariam
(74) Attorney, Agent, or Firm — Huffman Law Group, PC

(57) ABSTRACT

A fingerprint identification chip with enhanced ESD protection includes receiving pads disposed on a surface of a chip and arranged in a matrix format. The receiving pad has a central region and a peripheral region which surrounds at least an edge of the central region. The peripheral region of the receiving pad is higher than the central region.

5 Claims, 5 Drawing Sheets

FINGERPRINT IDENTIFICATION CHIP WITH ENHANCED ESD PROTECTION

BACKGROUND OF THE INVENTION

1. Field of the Invention

The present invention generally relates to a fingerprint identification system, and more particularly to a fingerprint identification chip with enhanced electrostatic discharge (ESD) protection.

2. Description of Related Art

Fingerprint identification has been gradually used in electronic devices, particularly handheld electronic devices (e.g., mobile phones or tablet personal computers) to replace password identification in a more convenient and safer manner.

Static electricity of human body or machine into a chip may generate large transient current that damages the chip. Electrostatic discharge (ESD) protection is thus an essential and important function for the chips. As the surface of a fingerprint identification chip is frequently subjected to finger touch, it thus needs more ESD protection capability than a general integrate circuit chip to ensure normal operation of the fingerprint identification.

However, the ESD protection circuit of conventional fingerprint identification chips is usually too late to be activated, such that static electricity may enter, malfunction or even damage internal circuitry of the chips. Moreover, the ESD protection circuit of conventional fingerprint identification chips is ordinarily not strong enough, such that large electrostatic discharge may cause breakdown to the ESD protection circuit and deprive the internal circuitry of ESD protection.

Accordingly, a need has arisen to propose a novel fingerprint identification chip with enhanced ESD protection to improve disadvantages of the conventional fingerprint identification chips.

SUMMARY OF THE INVENTION

In view of the foregoing, it is an object of the embodiment of the present invention to provide a fingerprint identification chip with enhanced ESD protection, which includes receiving pads each having a recessed central region and a protruding peripheral region, such that a finger touches the peripheral region first and static electricity transiently leaks out to ground via the periphery region, thereby enhancing ESD protection capability of the fingerprint identification chip.

According to one embodiment, a fingerprint identification chip with enhanced electrostatic discharge (ESD) protection includes a plurality of receiving pads disposed on a surface of a chip and arranged in a matrix format. Each receiving pad includes a central region and a peripheral region, and the peripheral region surrounds at least an edge of the central region. The peripheral region of the receiving pad is higher than the central region.

DETAILED DESCRIPTION OF THE INVENTION

Figure 1:
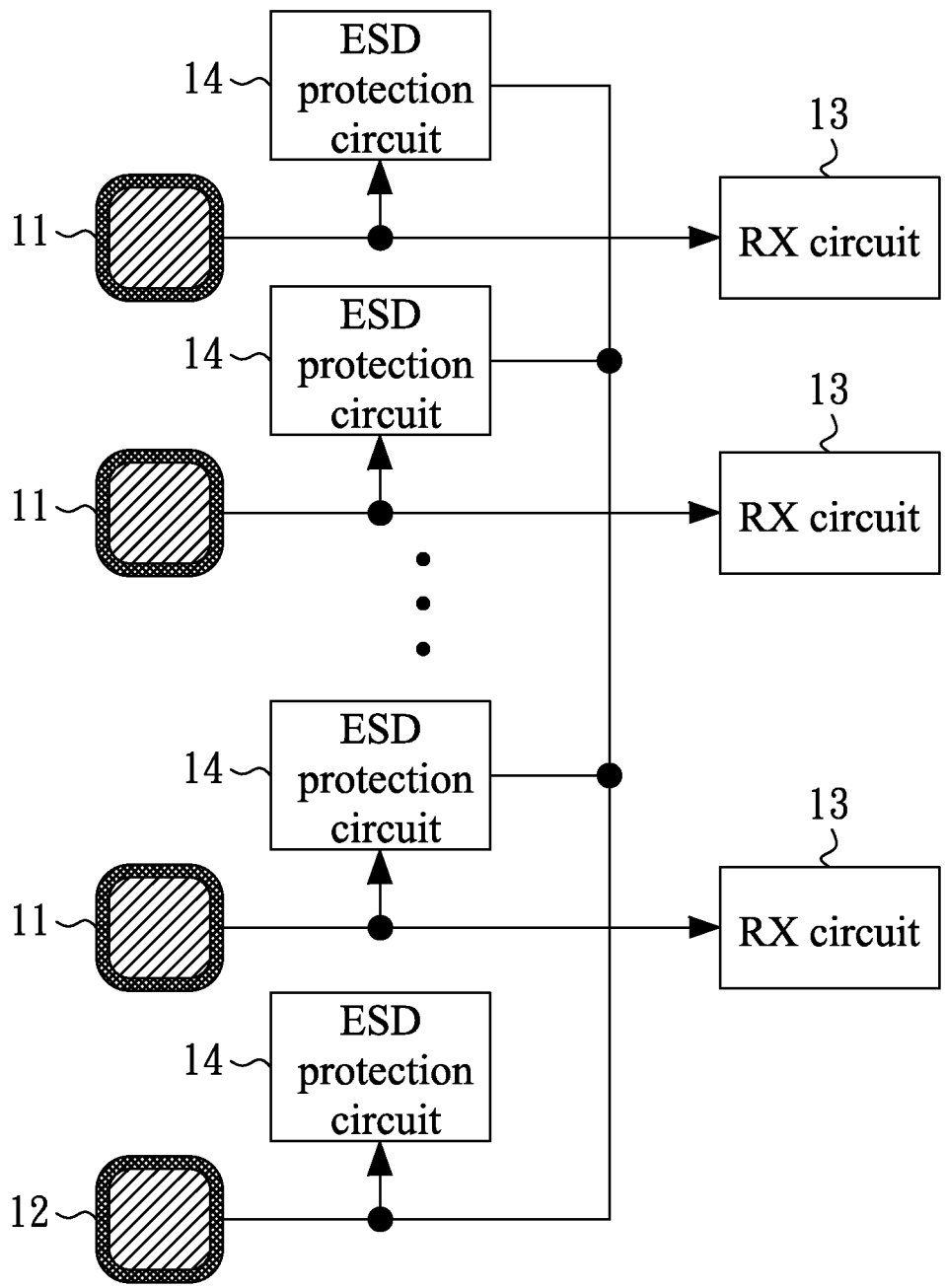
FIG. 1 shows a block diagram illustrated of a fingerprint identification system.

FIG. 1 shows a block diagram illustrated of a fingerprint identification system 100, which includes a plurality of receiving pads 11 and at least one power pad 12. The fingerprint identification system 100 also includes receiving (RX) circuits 13, which are electrically coupled to the receiving pads 11, respectively, for detecting fingerprint. The fingerprint identification system 100 further includes electrostatic discharge (ESD) protection circuits 14, which are electrically coupled to the receiving pads 11 and the power pad 12, for protecting the RX circuits 13 and internal circuitry (not shown).

Figure 2:
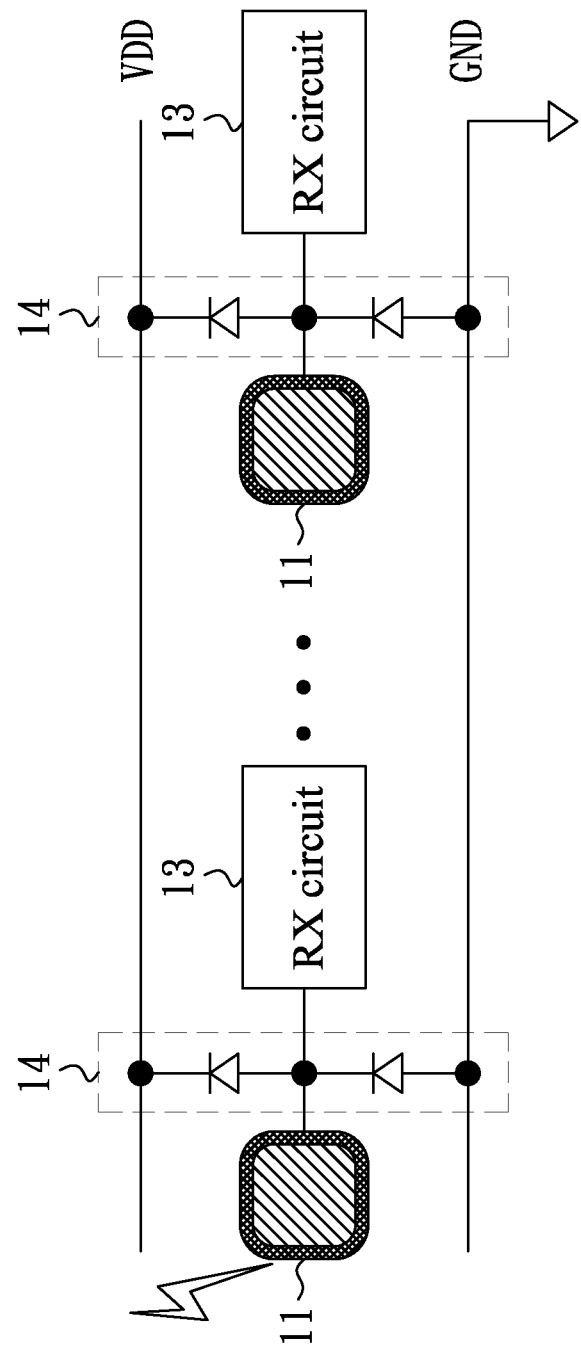
FIG. 2 shows a portion of the fingerprint identification system of FIG. 1.

FIG. 2 shows a portion of the fingerprint identification system 100 of FIG. 1 for the purpose of demonstrating working principle of the fingerprint identification system 100. At the moment when a finger touches the receiving pad 11, static electricity of the finger with an amount greater than a predefined value may activate the ESD protection circuit 14 via the receiving pad 11. The static electricity is then leaked out by being led to power VDD or ground GND, thereby preventing the static electricity from entering and damaging the RX circuit 13 and internal circuitry.

Figure 3:
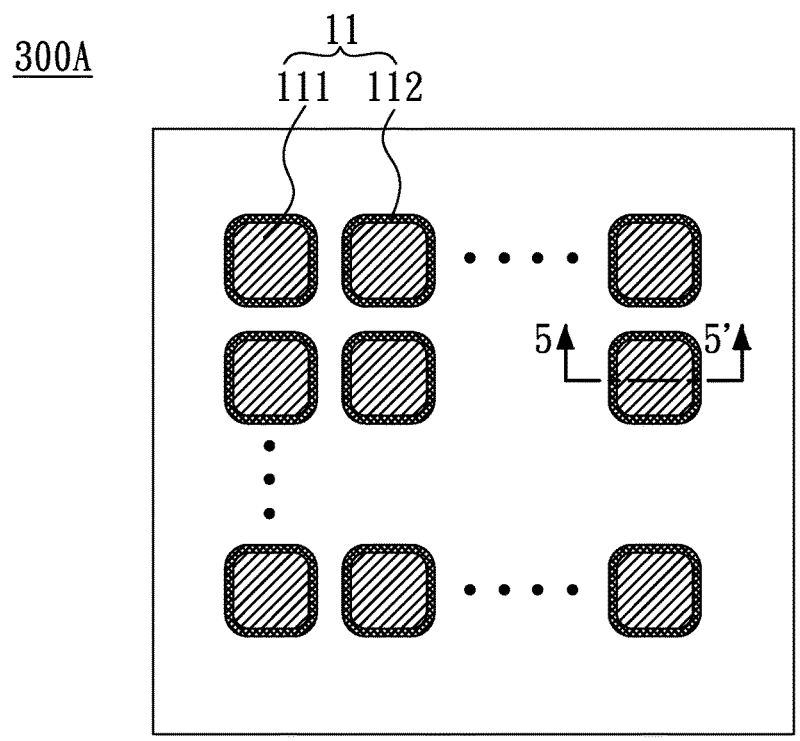
FIG. 3 shows a top view of a fingerprint identification chip with enhanced ESD protection according to one embodiment of the present invention.

FIG. 3 shows a top view of a fingerprint identification chip 300A (e.g., a capacitive fingerprint identification chip) with enhanced ESD protection according to one embodiment of the present invention. As shown in FIG. 3A, a plurality of receiving pads 11 are disposed on a surface of the fingerprint identification chip 300A with enhanced ESD protection (hereinafter "fingerprint identification chip"), and the receiving pads 11 are arranged in a matrix format to form a pad matrix. The receiving pad 11 includes a central region 111 and a peripheral region 112, where the peripheral region 112 surrounds at least an edge of the central region 111. In one embodiment, the edge of the receiving pad 11 may, but not necessarily, have a length of some micrometers to some hundred micrometers. The receiving pad 11 may have an arbitrary shape not limited to square as exemplified in FIG. 3.

Figure 4:
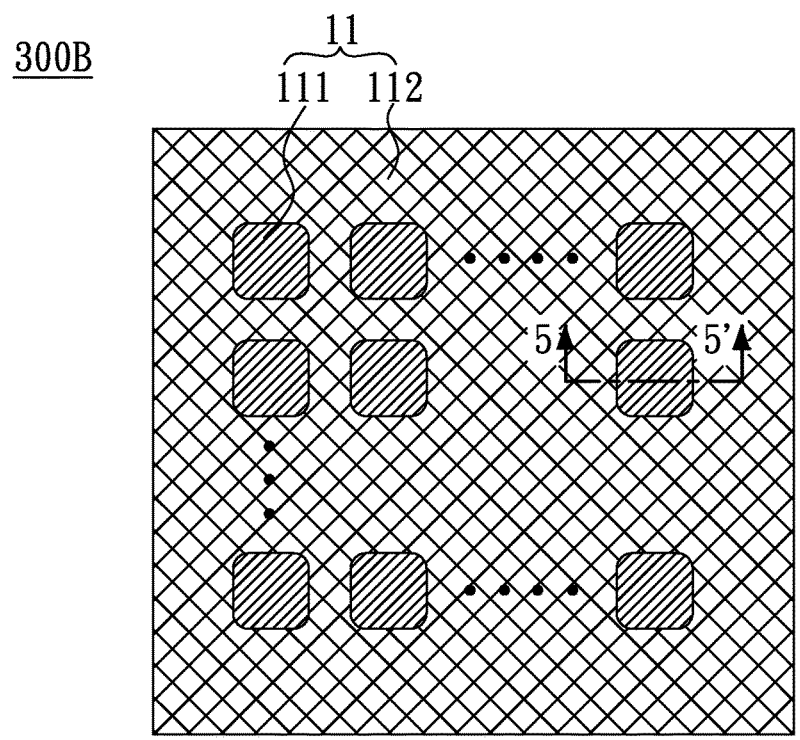
FIG. 4 shows a top view of a fingerprint identification chip with enhanced ESD protection according to another embodiment of the present invention.

FIG. 4 shows a top view of a fingerprint identification chip 300B with enhanced ESD protection (hereinafter "fingerprint identification chip") according to another embodiment of the present invention. Compared with the fingerprint identification chip 300A of FIG. 3, no gap exists between neighboring receiving pads 11 of the fingerprint identification chip 300B (FIG. 4), such that the neighboring receiving pads 11 share the peripheral region 112. Accordingly, the pad matrix of FIG. 4 may have a density greater than the fingerprint identification chip 300A of FIG. 3.

Figure 5:
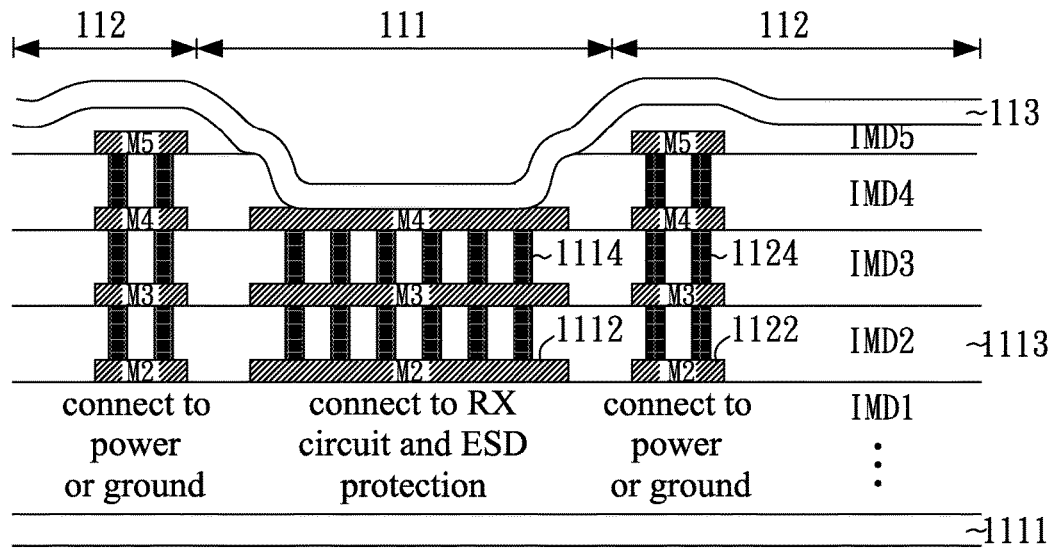
FIG. 5 shows a cross-sectional view of FIG. 3 or FIG. 4.

FIG. 5 shows a cross-sectional view along cross line 5-5' of FIG. 3 or FIG. 4. As shown in FIG. 5, in the central region 111, the receiving pad 11 includes a substrate 1111 and at least one metal layer 1112 (three metal layers M2, M3 and M4 are exemplified in FIG. 5) disposed above the substrate 1111, where the metal layers 1112 are disposed in corresponding dielectric layers 1113 (e.g., inter-metal dielectric (IMD) layer). The receiving pad 11 also includes, in the central region 111, a plurality of vias 1114 that are connected between metal layers 1112, or are connected to the RX circuit 13 and the ESD protection circuit 14.

In the peripheral region 112, the receiving pad 11 includes a plurality of metal layers 1122 (four metal layers M2, M3, M4 and M5 are exemplified in FIG. 5) disposed above the substrate 1111, where the metal layers 1122 are disposed in corresponding dielectric layers 1113. The receiving pad 11 also includes, in the peripheral region 112, a plurality of vias 1124 that are connected between metal layers 1122, or are connected to ground GND or power VDD.

According to one aspect of the embodiment, a top metal layer 1122 (e.g., the metal layer in the IM5 of FIG. 5) of at least one peripheral region 112 is higher than a top metal layer 1112 of the central region 111, thereby resulting in a recessed central region 111 and a protruding peripheral region 112 as shown in FIG. 5. In other words, the peripheral region 112 is higher than the central region 111.

A protection layer 113 may cover the central region 111 and the peripheral region 112 of the receiving pad 11. The protection layer 113 may be a passivation protection layer (e.g., silicon nitride, silicon carbide, aluminum oxide, etc.) as commonly used in an integrated circuit process. Alternatively, the protection layer 113 may, for example, be a sapphire protection layer as commonly used in a chip packaging process.

Figure 6A:
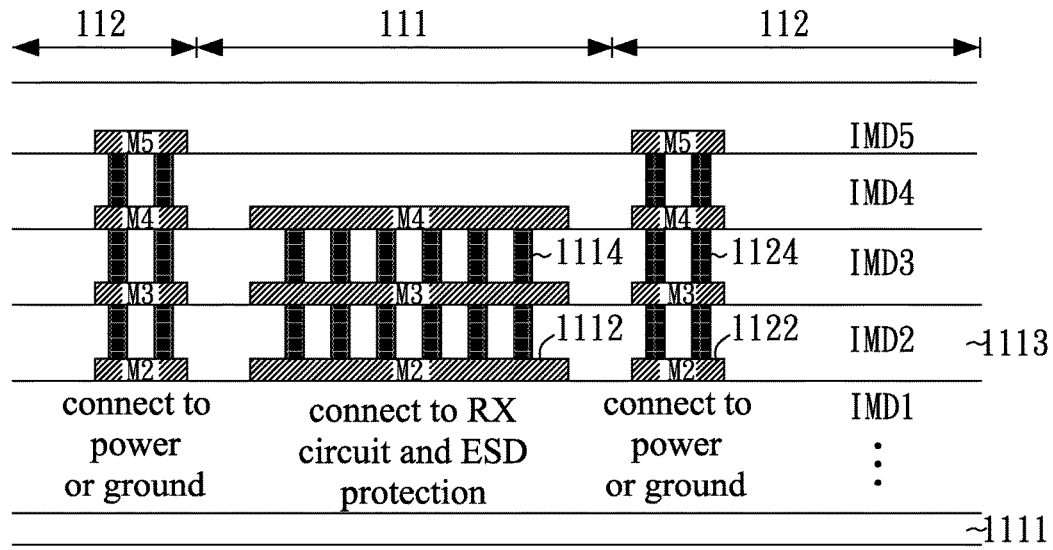
FIG. 6A to FIG. 6C show a process method of the fingerprint identification chip of FIG. 5.
Figure 6B:
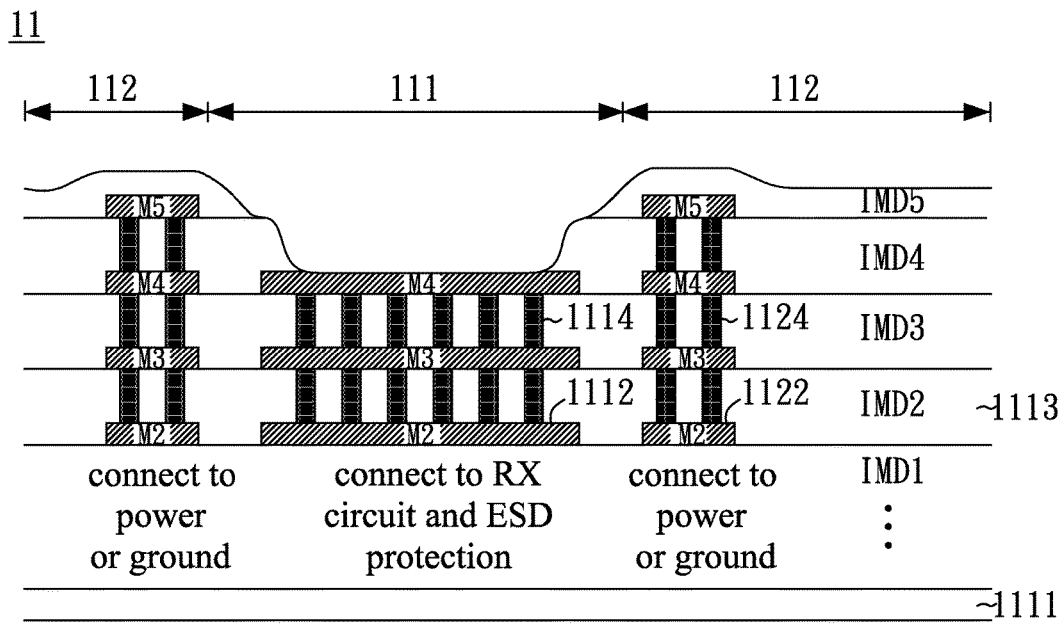
Figure 6C:
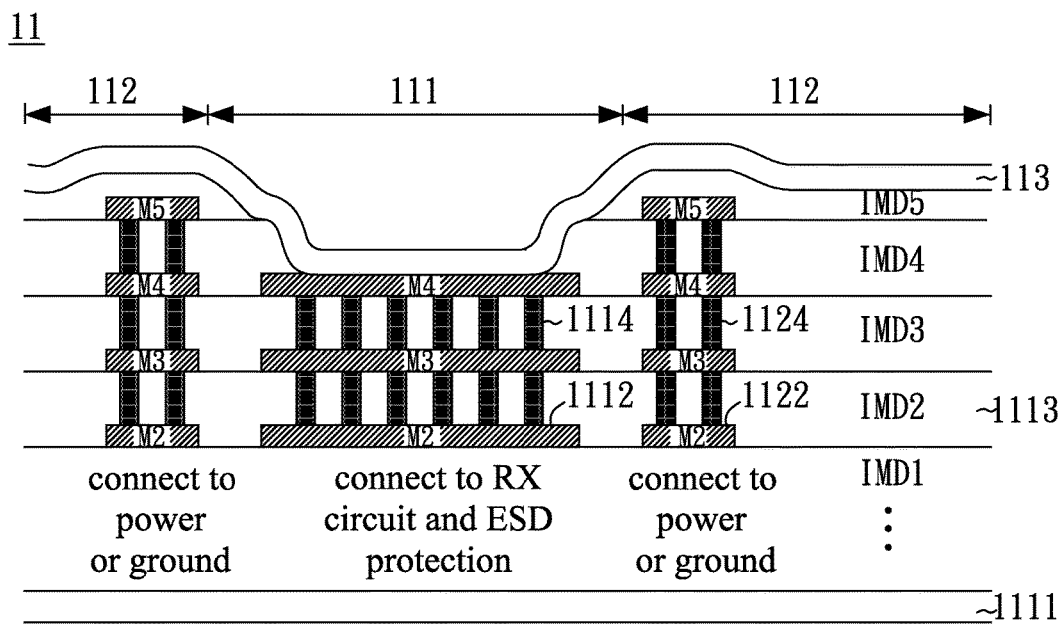

FIG. 6A to FIG. 6C show a process method of the fingerprint identification chip 300A/B of FIG. 5. As shown in FIG. 6A, a plurality of dielectric layers 1113 are formed overall (i.e., in the central region 111 and the peripheral region 112 of the receiving pad 11) in turns above the substrate 1111. Corresponding metal layers 1112/1122 (four metal layers M2, M3, M4 and M5 are exemplified in FIG. 6A) are formed in the dielectric layers 1113 respectively, and vias 1114/1124 are formed between the metal layers 1112/1122. It is noted that the metal layers 1112 of the central region 111 and the metal layers 1122 of the peripheral region 112 may be formed at the same time. According to one aspect of the embodiment, an amount of the metal layers 1122 in the peripheral region 112 is greater than an amount of the metal layers 1112 in the central region 111. As exemplified in FIG. 6A, four metal layers 1122, i.e., M2, M3, M4 and M5 are formed in the peripheral region 112, while three metal layers 1112, i.e., M2, M3 and M4 are formed in the central region 111.

Subsequently, as shown in FIG. 6B, at least one top dielectric layer 1113 is overall etched until a surface of the metal layer 1112 of the central region 111 is exposed. Finally, as shown in FIG. 6C, a protection layer 113 overall covers the central region 111 and the peripheral region 112 of the receiving pad 11.

According to the embodiment described above, when a finger touches a surface of the pad matrix of the fingerprint identification chip 300A/B, different capacitances are induced due to different distances between a curving finger and the receiving pads 11, therefore facilitating identification of fingerprint. According to aspect of the embodiment (FIG. 5), when a finger presses, it first touches the protruding peripheral region 112 of the receiving pads 11. Accordingly, before touching the recessed central region 111, static electricity of a finger transiently (e.g., in some hundred nanoseconds) leaks out to ground GND or power VDD via the metal layers 1122 and vias 1124 of the periphery region 112, thereby enhancing ESD protection capability of the fingerprint identification chip 300A/B.

Although specific embodiments have been illustrated and described, it will be appreciated by those skilled in the art that various modifications may be made without departing from the scope of the present invention, which is intended to be limited solely by the appended claims.

What is claimed is:

1. A fingerprint identification chip with enhanced electrostatic discharge (ESD) protection, comprising:
 a plurality of receiving pads disposed on a surface of a chip and arranged in a matrix format, each said receiving pad including a central region and a peripheral region, and the peripheral region surrounding at least an edge of the central region;
 wherein the peripheral region of the receiving pad is higher than the central region;
 wherein a top metal layer in the peripheral region of the receiving pad is higher than a top metal layer in the central region of the receiving pad;
 wherein the central region of the receiving pad comprises:
  at least one first metal layer disposed above a substrate, the at least one first metal layer being respectively disposed in a corresponding dielectric layer;
  a plurality of first vias connected between neighboring different first metal layers that are arranged separately within the central region, and electrically connected to a receiving circuit and an ESD protection circuit;
 wherein the peripheral region of the receiving pad comprises:
  a plurality of second metal layers disposed above the substrate, the plurality of second metal layers being respectively disposed in corresponding dielectric layers;
  a plurality of second vias connected between neighboring different second metal layers that are arranged separately within the peripheral region, and electrically connected to power or ground;
 wherein the receiving pad comprises a protection layer that covers the top metal layer and a top dielectric layer in the central region, and covers the top metal layer and a top dielectric layer in the peripheral region.

2. A fingerprint identification system with enhanced electrostatic discharge (ESDI protection, comprising:
 a plurality of receiving pads arranged in a matrix format;
 a plurality of receiving circuits electrically coupled to the plurality of receiving pads respectively for detecting fingerprint; and
 a plurality of ESD protection circuits electrically coupled to the plurality of receiving pads respectively for protecting the plurality of receiving circuits;
 wherein each said receiving pad includes a central region and a peripheral region, the peripheral region surrounding at least an edge of the central region, and the peripheral region of the receiving pad is higher than the central region;
 wherein a top metal layer in the peripheral region of the receiving pad is higher than a top metal layer in the central region of the receiving pad;
 wherein the central region of the receiving pad comprises:
  at least one first metal layer disposed above a substrate, the at least one metal layer being respectively disposed in a corresponding dielectric layer;
  a plurality of first vias connected between neighboring different first metal layers that are arranged separately within the central region, and electrically connected to the receiving circuit and the ESD protection circuit;
 wherein the peripheral region of the receiving pad comprises:

a plurality of second metal layers disposed above the substrate, the plurality of second metal layers being respectively disposed in corresponding dielectric layers;

a plurality of second vias connected between neighboring different second metal layers that are arranged separately within the peripheral region, and electrically connected to power or ground;

wherein the receiving pad comprises a protection layer that covers the top metal layer and a top dielectric layer in the central region, and covers the top metal layer and a top dielectric layer in the peripheral region.

3. A method of forming a fingerprint identification chip with enhanced electrostatic discharge (ESD) protection, comprising:

providing a substrate;

forming a plurality of dielectric layers in turns above the substrate in a central region and a peripheral region of a receiving pad;

forming a plurality of first metal layers in the plurality of dielectric layer respectively within the central region and forming a plurality of second metal layers in the plurality of dielectric layer respectively within the peripheral region, an amount of the second metal layers in the peripheral region being greater than an amount of the first metal layers in the central region;

forming a plurality of first vias between neighboring different first metal layers that are arranged separately within the central region, and forming a plurality of second vias between neighboring different second metal layers that are arranged separately within the peripheral region;

etching at least one of the plurality of dielectric layers until a surface of a top metal layer in the central region is exposed; and covering a protection layer on the central region and the peripheral region.

4. The method of claim 3, wherein the central region and the peripheral region form the receiving pad, and the peripheral region of the receiving pad is higher than the central region.

5. The method of claim 3, wherein the central region electrically connects to a corresponding receiving circuit and a corresponding ESD protection circuit, and the peripheral region electrically connects to power or ground.

* * * * *